(12) United States Patent
Luong (10) Patent No.: US 10,592,256 B2
(45) Date of Patent: Mar. 17, 2020

(54) EARLY BOOT DISPLAY SYSTEM

(71) Applicant: Dell Products L.P., Round Rock, TX (US)

(72) Inventor: Anh Dinh Luong, Austin, TX (US)

(73) Assignee: Dell Products L.P., Round Rock, TX (US)

(*) Notice: Subject to any disclaimer, the term of this patent is extended or adjusted under 35 U.S.C. 154(b) by 130 days.

(21) Appl. No.: 15/968,126

(22) Filed: May 1, 2018

(65) Prior Publication Data
US 2019/0339983 A1 Nov. 7, 2019

(51) Int. Cl.
*G06F 9/44* (2018.01)
*G06F 9/451* (2018.01)
*G06F 11/22* (2006.01)
*G06F 3/048* (2013.01)
*G06F 9/4401* (2018.01)
*G06F 3/0484* (2013.01)

(52) U.S. Cl.
CPC .......... *G06F 9/4401* (2013.01); *G06F 3/0484* (2013.01); *G06F 9/451* (2018.02); *G06F 11/2284* (2013.01)

(58) Field of Classification Search
CPC .... G06F 9/4401; G06F 9/451; G06F 11/2284; G06F 3/0484
See application file for complete search history.

(56) References Cited

U.S. PATENT DOCUMENTS

| | | | | |
|---|---|---|---|---|
| 6,052,800 A | * | 4/2000 | Gentile | G06F 11/2284 713/2 |
| 6,487,655 B1 | * | 11/2002 | Wildgrube | G06F 9/4403 713/2 |
| 9,600,295 B2 | * | 3/2017 | Liu | G06F 9/4411 |
| 9,652,251 B2 | * | 5/2017 | Gillon | G06F 9/4403 |

OTHER PUBLICATIONS

Wei Liu, "Troubleshooting Guide for BIOS POST ON 13th Generation of Dell PowerEdge Servers," Sep. 2014, 17 Pages, Dell Server BIOS Development, Dell Inc.

* cited by examiner

*Primary Examiner* — Stefan Stoynov
(74) *Attorney, Agent, or Firm* — Haynes and Boone, LLP (57) ABSTRACT

A secondary processing system that is coupled to a primary processing system and a display system accesses a first memory system to load initial boot instructions and a video interpreter binary during a boot operation. The secondary processing system initializes the display controller included in the display system to provide a first graphical user interface for display on the display screen using the video interpreter binary and executes the initial boot instructions. The secondary processing system then detects a first interrupt event during the execution of the initial boot instructions and, in response, triggers the video interpreter binary to update the first graphical user interface displayed on the display screen to provide a second graphical user interface for display on the display screen.

20 Claims, 7 Drawing Sheets

EARLY BOOT DISPLAY SYSTEM

BACKGROUND

The present disclosure relates generally to information handling systems, and more particularly to an early boot video display system for information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch computing devices, server computing devices, laptop/desktop computing devices, and other computing devices known in the art, perform a boot operation when powered on. The boot operation includes a series of processes that are performed to initialize the computing device before an operating system is loaded. During such boot operations, status reports for the boot operation and/or errors that occur during the boot operation may be provided to a user through a graphical user interface (GUI) that may be presented on a display subsystem of the computing device after a video controller for that display subsystem has been initialized by a basic input/output system (BIOS) in the computing device. A primary processing system in the computing device that loads the BIOS may update the GUI as the boot operation progresses or if any error occurs. However, computing systems now often include a secondary processing system in addition to the primary processing system. This secondary processing system may perform security functions during the boot operation that occur before the primary processing system is loaded and executes the BIOS code. Thus, in systems that include such secondary processing systems, many boot operations and/or errors may occur before the dynamic GUI has been initiated such that it may continually update the progress of the boot operations. One conventional solution to this problem is to provide an application programming interface (API) for the BIOS that allows for the initialization of a display device and the display of a static image before the primary processing system executes the BIOS code, functionality that may be enabled by providing a byte code program to an interpreter that executes prior to memory initialization. However, such static images lack the ability to provide progress updates for the boot operation, and/or report errors that may occur during the boot operation.

Accordingly, it would be desirable to provide an improved early boot display system.

SUMMARY

According to one embodiment, an information handling system, includes a display system that includes a video controller and a display screen; a first memory system that includes initial boot instructions and a video interpreter binary; a primary processing system; and a secondary processing system that is coupled to the primary processing system and the display system, wherein the secondary processing system is configured to access the first memory system to: load the initial boot instructions and the video interpreter binary during a boot operation; initialize the video controller included in the display system to provide a first graphical user interface for display on the display screen using the video interpreter binary; execute the initial boot instructions; and detect a first interrupt event during the execution of the initial boot instructions and, in response, trigger the video interpreter binary to update the first graphical user interface displayed on the display screen to provide a second graphical user interface for display on the display screen.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
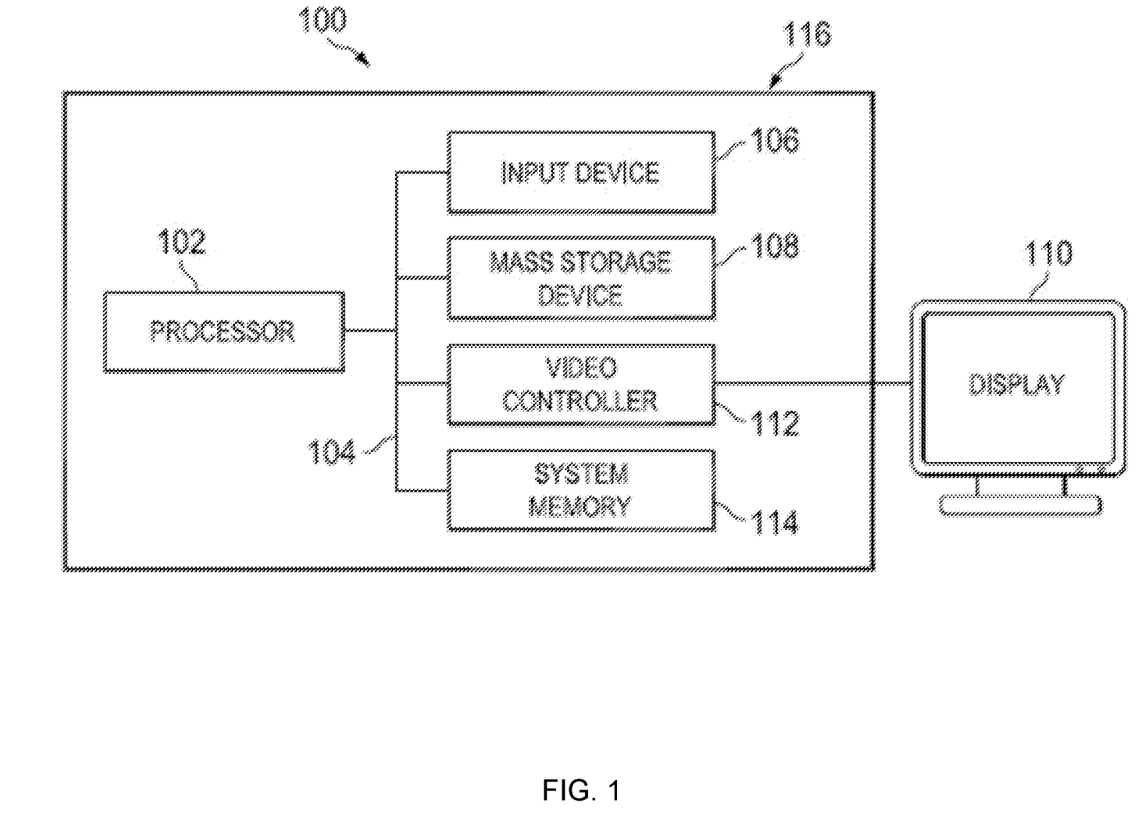
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
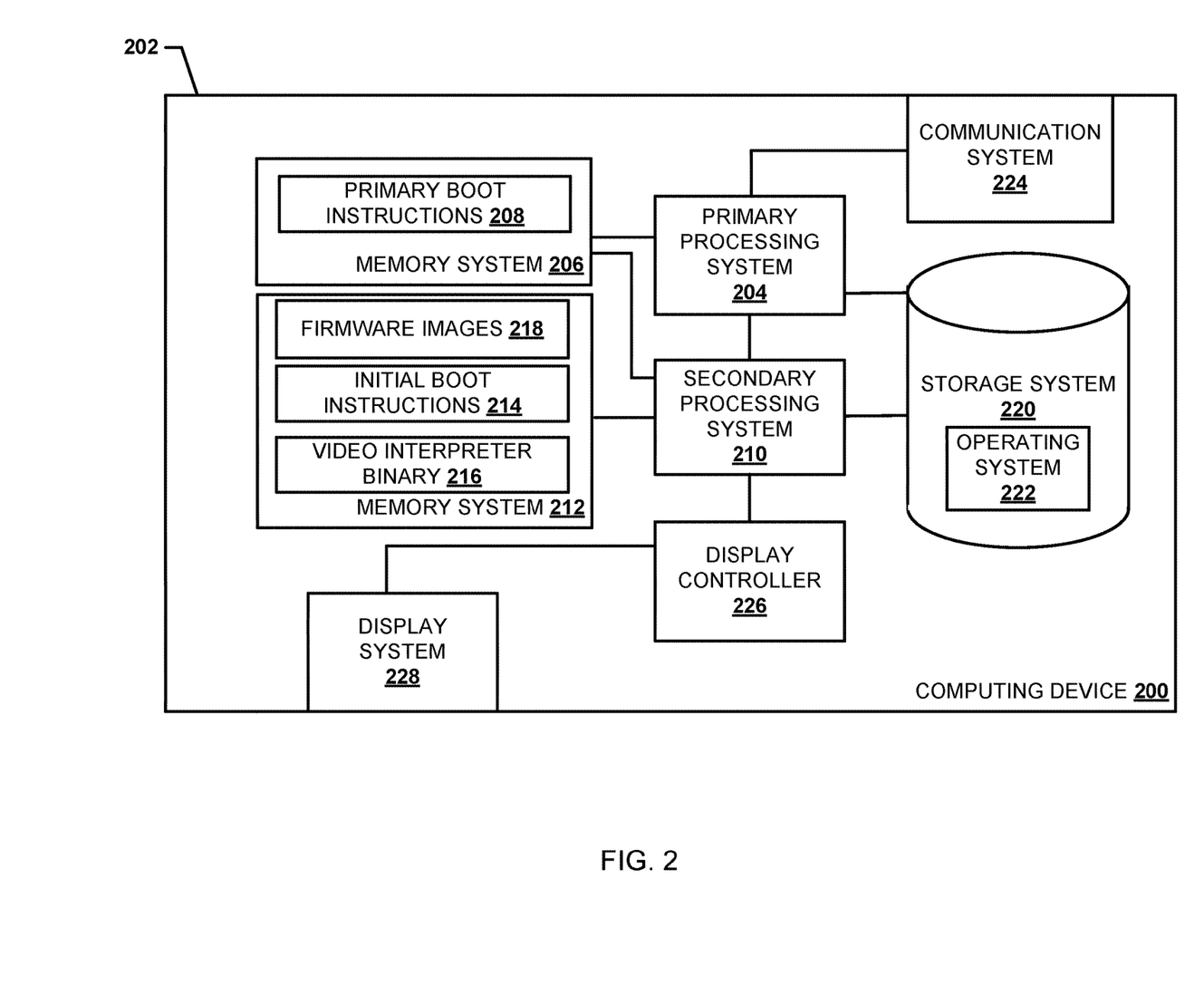
FIG. 2 is a schematic view illustrating an embodiment of a computing device that includes an early boot display system.

Referring now to FIG. 2, an embodiment of a computing device 200 is illustrated. In an embodiment, the computing device 200 may be the IHS 100 discussed above with reference to FIG. 1 and/or may include some or all of the components of the IHS 100. In specific embodiments, the computing device 200 may be a computing device such as, for example, a desktop computing device, a laptop/notebook computing device, a tablet computing device, a mobile phone computing device, a wearable computing device, a networking computing device (e.g., a switch device), a server computing device, and/or a variety of other computing devices that would be apparent to one of skill in the art in possession of the present disclosure. The computing device 200 includes a chassis 202 that houses the components of the computing device 200, only some of which have been illustrated for clarity. In the illustrated embodiment, the chassis 202 houses a primary processing system 204 that may include one or more processors (e.g., the processor 102 discussed above with reference to FIG. 1). The primary processing system 204 may be coupled to a primary memory system 206 that may include the system memory 114 discussed above with reference to FIG. 1. However, one of skill in the art in possession of the present disclosure will recognize that the primary processing system 204 may be provided by a variety of processing systems that are utilized to perform processing functions related to, for example, running an operating system, while remaining within the scope of the present disclosure. In various embodiments, the primary processing system 204 may be configured according to the x86 architecture.

The primary memory system 206 may include any of a variety of memory devices and/or other components that allow for the storage of the instructions discussed below. In the illustrated embodiment, the primary memory system 206 includes primary boot instructions 208 that may provide a simplified version of conventional primary boot instructions utilized in conventional boot systems (e.g., platform firmware such as, for example, a Basic Input/Output System (BIOS), a Unified Extensible Firmware Interface (UEFI), and/or other BIOS implementations that would be apparent to one of skill in the art in possession of the present disclosure). The primary boot instructions 208 may be configured to cause the performance of hardware initialization during a boot operation of the computing device 200 (e.g., a power-on startup test (POST), restart, and/or other initialization of the computing device 200), provide runtime services for operating systems and/or programs executed by the primary processing system 204, and/or perform any other conventional BIOS functionality known in the art in addition to the novel functionality described below.

The chassis 202 also includes a secondary processing system 210 that is coupled to the primary processing system 204 and a secondary memory system 212. The secondary processing system 210 may include a secure processor that is segregated, distinct from, and/or otherwise separate from the processor 102 in the IHS 100, discussed above with reference to FIG. 1. The secondary memory system 212 may be coupled to the secondary processing system 210 and may include a memory device that is segregated, distinct from, and/or otherwise separate from the system memory 114 in the IHS 100, discussed above with reference to FIG. 1, such that the secondary memory system 212 is accessible by the secondary processing system 210 but not the primary processing system 204. In various examples, the primary processing system 204, the secondary processing system 210, the primary memory system 206, and/or the secondary memory system 212 may be provided by a system on chip (SoC) such as, for example, the NAPLES™ SoC manufactured by Advanced Micro Devices, Inc (AMD) of Santa Clara, Calif. However, one of skill in the art in possession of the present disclosure would recognize that the primary processing system 204, the secondary processing system 210, the primary memory system 206, and/or the secondary memory system 212 may be provided on other SoCs, and/or may be distinct systems that are coupled together by a communication bus, while remaining within the scope of the present disclosure.

One of skill in the art in possession of the present disclosure will recognize that the secondary processing system 210 in the chassis 202 may be a variety of secondary processing systems that may be utilized by the computing device 200 to perform secure processing functions while remaining within the scope of the present disclosure. In various embodiments, the secondary processing system 210 may be provided by a Secure Processor™ (i.e. Platform Security Processor™ (PSP)) available from AMD®, a Management Engine™ (ME) manufactured by Intel® Corp. of Santa Clara, Calif., and/or any other secondary processing system that may be provided separate from the primary processing system 204 and that performs operations prior to the execution of the primary boot instructions by the primary processing system 204. The secondary processing system 210 may include a plurality of components such as, for example, a dedicated microcontroller (e.g., an ARM® architecture based 32-bit microcontroller), an isolated on-chip ROM, an isolated on-chip SRAM, an interface to the primary memory system 206 and the secondary memory system 212, hardware logic for secure control of the initialization of the primary processing system 204, a cryptographic co-processor (which may include, for example, a random number generator (RNG), several engines to process standard cryptographic algorithms (AES, RSA, SHA, and other algorithms that would be apparent to one of skill in the art in possession of the present disclosure), a key storage block, and/or other cryptographic components/applications), an interface for accessing a video controller, a one-time pad (OTP) for platform unique key material, and/or any other components that would be apparent to one of skill in the art in possession of the present disclosure. The key storage block of the cryptographic co-processor may provide two key storage areas: one dedicated to storing system keys that can be used by privileged software but that are never readable, and the other into which keys can be loaded, used, and evicted during normal operation by software running either on the secondary processing system 210 and/or on the primary processing system 204 during runtime.

In an embodiment, the secondary memory system 212 may include initial boot instructions 214, a video interpreter binary 216, and/or other firmware images 218. The secondary memory system 308 may be provided by a read only memory (ROM) and/or any other non-volatile memory that would be apparent to one of skill in the art in possession of the present disclosure. The initial boot instructions 214 may include firmware such as, for example, an AMD Generic Encapsulated Software Architecture (AGESA)™ bootloader (ABL) that is provided by AMD's® PSP™. As discussed below, the initial boot instructions 214 may allow for the setup of clocks and memory access, followed by providing the ability to activate the primary boot instructions 208. During a boot operation for the computing device 200, the secondary processing system 210 may perform a Hardware Validated Boot (HVB) upon startup of the computing device 200, which is an AMD-specific form of secure boot that roots the trust to hardware in an immutable on-chip ROM provided on the secondary processing system 210, and verifies the integrity of the primary boot instructions 208. The immutable on-chip ROM may include initial immutable code executed by the secondary processing system 210 to validate a secure boot key, and that secure boot key may then be used to validate the initial boot instructions 214, which the secondary processing system 210 may read from the secondary memory system 212 and/or, in some embodiments, the primary memory system 206. The initial boot instructions 214 may load and start the system application execution. For, example, the secondary processing system 210 may use the initial boot instructions 214 to validate the primary boot instructions 208, and the secondary processing system 210 may then initiate execution of the primary boot instructions 208. The secondary processing system 210 may also complete its own initialization and may enter steady state while the primary boot instructions 208 and an operating system (OS) 222 finish booting on the primary processing system 204.

In an embodiment, the OS 222 may be stored on a storage system 220 that is housed in the chassis 202 and coupled to the primary processing system 204. The storage system 220 may include any of a variety of storage devices and/or other components that allow for the storage of the images and data discussed below. In an embodiment, the primary processing system 204 may be coupled to a communication system 224. The communication system 224 may include any of a variety of communication components that allow for the coupling of the computing device 200 to another computing device (e.g., directly, indirectly via a network, etc.) For example, the communication system 224 may include a network interface controller (NIC), a wireless communication system, and/or other communication components known in the art.

In various embodiments, the chassis 202 may house an additional processing system (not illustrated, but which may include the processor 102 discussed above with reference to FIG. 1) and a memory system (not illustrated, but which may include the memory 114 discussed above with reference to FIG. 1) that includes instructions that, when executed by the processing system, cause the processing system to provide a display controller 226 that is configured to perform the functions of the display controllers and computing devices discussed below. In a specific example, the processing system that provides the display controller 226 may be coupled to the secondary processing system 210 via a Peripheral Component Interconnect (PCI)/PCI express (PCIe) interface, may include a graphics processing unit (GPU), and may be configured to render the early video display discussed below. However, one of skill in the art in possession of the present disclosure would recognize that the display controller 226 may be included on a SoC while remaining within the scope of the present disclosure as well.

The chassis 202 also houses a display system 228 that is coupled to the display controller 226 (e.g., via a coupling between the secondary processing system 210 and the display system 228). In an embodiment, the display system 228 may be provided by a display device that is integrated into the computing device 200 and that includes a display screen (e.g., a cathode ray tube (CRT) display screen, an light-emitting diode (LED) display screen, a liquid crystal display (LCD) screen, an organic light-emitting diode (OLED) display screen, and/or any other display screen that would be apparent to one of skill in the art in possession of the present disclosure). In another embodiment, the display system 228 may be provided by a display device that is coupled directly to the computing device 200 (e.g., a display device coupled to the computing device 200 by a cable or wireless connection). The display system 228 may include a display screen via which a graphical user interface (GUI) may be provided by the display controller 226. While a specific embodiment of the computing device 200 is illustrated and described herein, one of skill in the art in possession of the present disclosure will recognize that a wide variety of modification to the components and configurations of the computing device 200 will fall within the scope of the present disclosure as well.

Figure 3:
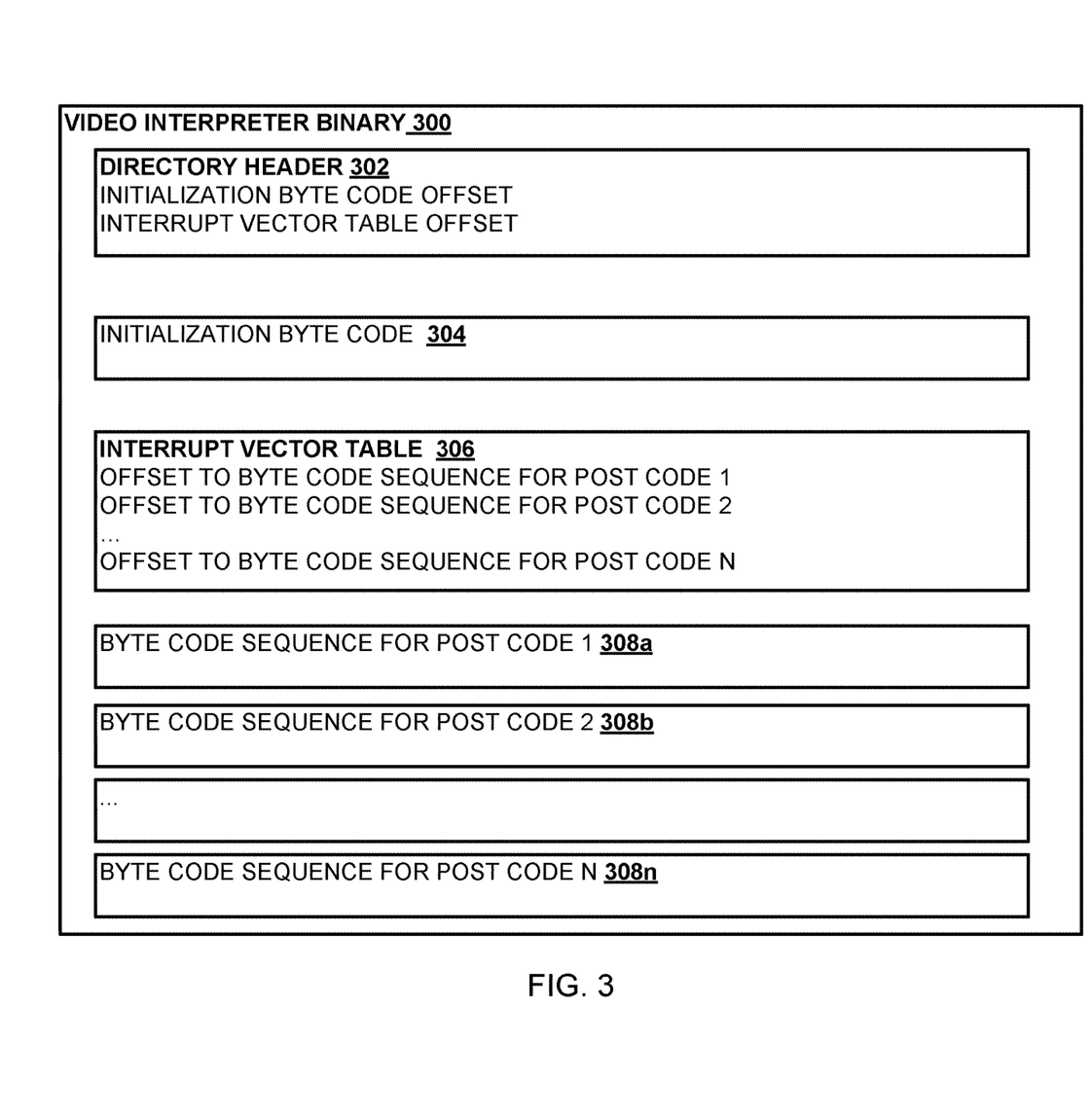
FIG. 3 is a schematic view illustrating an embodiment of a video interpreter binary provided by the early boot display system of FIG. 2.

Referring now to FIG. 3, an embodiment of a video interpreter binary 300 is illustrated, which may be the video interpreter binary 216 stored in the secondary memory system 212 of FIG. 2. The video interpreter binary 300 may include a directory header 302 that may include an initialization byte code offset that provides a pointer to an initialization byte code 304 that includes a series of bytes that the secondary processing system 210 may use to initialize the display controller 226. The directory header 302 may also include an interrupt vector table offset that provides a pointer to an interrupt vector table 306. The interrupt vector table 306 may include a plurality of entries that include offset(s) that point to corresponding byte code sequences 308a, 308b, and up to 308n. Those entries may include an offset that is associated with an interrupt code of the initial boot instructions 214 such as, for example, a power-on self-test (POST) code or an error, which may be defined by a POST code. The byte code sequences 308a-308n may include byte code that may be executed by the display controller 226 to provide for the display the corresponding POST code or error, as discussed in further detail below. While a specific embodiment of the video interpreter binary 300 is illustrated and described herein, one of skill in the art in possession of the present disclosure will recognize that a wide variety of modification to the elements of the video interpreter binary 300 and/or other data structures for displaying video early in the boot operation will fall within the scope of the present disclosure as well.

Figure 4:
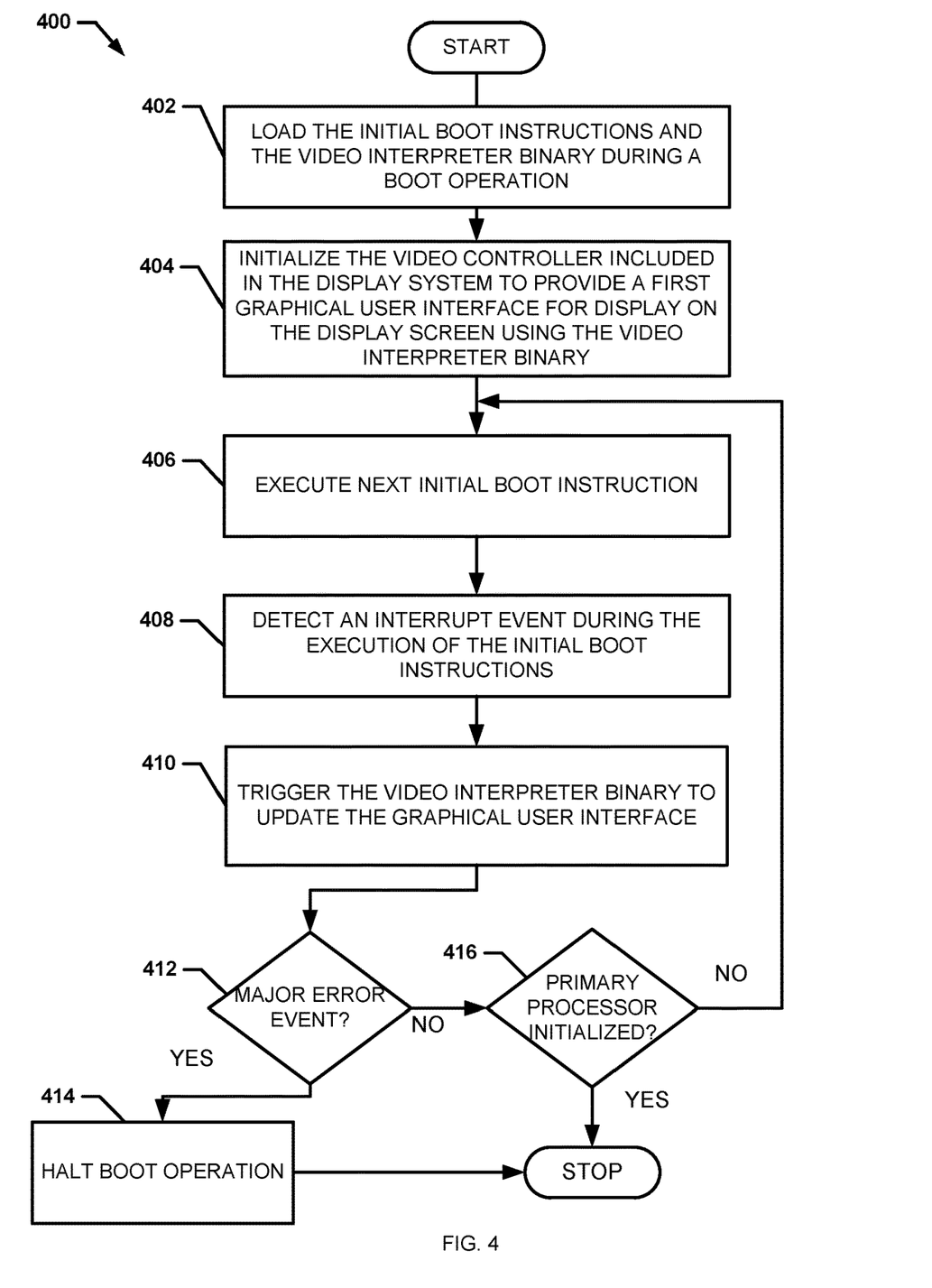
FIG. 4 is a flow chart illustrating an embodiment of a method for displaying video early during a boot operation.

Referring now to FIG. 4, an embodiment of a method 400 for early boot display of video is illustrated. As discussed above, conventional computing devices lack the ability to provide video on a display screen prior to the initialization of their primary processing system during boot operations. While some conventional computing devices are configured to provide a static image on a display screen prior to initialization of the primary processing system, these static images simply indicate whether the computing device has started, and do not provide any further detail about the progress of the boot operation and/or error reporting during this early boot phase of the computing device. The systems and methods of the present disclosure provide a video interrupter binary that may be accessed during an initial boot phase of the boot operation by a secondary processor that executes initial boot code. The video interrupter binary may cause the secondary processing system to initialize a display controller, and may provide display instructions to the secondary processing system when the initial boot instructions reach an interrupt event in the initial boot instructions. Each display instruction may be associated with an interrupt event, and may cause the display controller to display a GUI on the display screen of a display system, as well as return the secondary processing system to the initial boot instructions. This process may be repeated for each interrupt event until the secondary processing system hands off control to the boot operation to the primary processing system, and/or until an error occurs during the initial boot operation. The updating of the display screen for each interrupt event provides dynamic video to a user before the primary processing system is capable of controlling the boot operation.

The method 400 begins at block 402 where the initial boot instructions and the video interpreter binary are loaded during a boot operation. In an embodiment of block 402, the computing device 200 may receive a command to initiate a power on or a restart of the computing device 200, which results in the initiation of a boot operation for the computing device 200. As discussed above, in response to the initiation of the boot operation, power may be provided to the secondary processing system 210, and the secondary processing system 210 may be configured to initiate a secure boot upon receiving power. During the secure boot, the secondary processing system 210 may validate the immutable on-chip ROM provided on the secondary processing system 210. For example, the immutable on-chip ROM may include initial immutable code for use by the secondary processing system 210 in validating a secure boot key, and the secure boot key may then be used to validate the initial boot instructions 214, which the secondary processing system 210 may read from the secondary memory system 212 and/or, in some embodiments, the primary memory system 206. The initial boot instructions 214 are then loaded in the RAM of the secondary processing system 210, which causes the secondary processing system 210 to start the system application execution. The video interpreter binary 216 may also be validated and loaded from the secondary memory system 212 and/or the primary memory system 206.

The method 400 then proceeds to block 404 where the display controller included in the display system is initialized and uses the video interpreter binary to provide a first graphical user interface for display on the display screen. In an embodiment of block 404, the initial boot instructions 214 may be executed by the secondary processing system 210, which may cause the secondary processing system 210 to train the port (e.g., a PCIe root port) connected to the display controller 226. After the display controller 226 has been trained by the secondary processing system 210 using the initial boot instructions 214, the secondary processing system 210 may execute the video interpreter binary 216, which causes the secondary processing system 210 to initialize the display controller 226 by providing configuration cycles (e.g., PCIe configuration cycles) to the display controller 226. For example, the secondary processing system 210 may reference the directory header 302 included in the video interpreter binary 216, which may provide the offset to the initialization byte code 304 that the secondary processing system 210 may use to initialize the display controller 226. The display controller 226 may then provide an initial graphical user interface on the display screen of the display system 228 based on the initialization byte code. In an embodiment, the initial graphical user interface may provide an indication to a user of the computing device 200 that the computing device 200 has powered on and that the display controller 226 has initialized. For example, the initial graphical user interface may provide a blank screen that, when present, indicates to the user that the display controller 226 has been initiated. However, in other examples, the initial graphical user interface may include any text, graphics, symbols, and/or any other display controller initialization indication that would be apparent to one of skill in the art in possession of the present disclosure.

The method 400 then proceeds to block 406 where the initial boot instructions are executed by the secondary processing system. In an embodiment of block 406, the secondary processing system 210 may execute the initial boot instructions 214 to perform memory and data initialization, load and execute the firmware images 218 (e.g., firmware for a trusted platform module (TPM)), perform validation of the primary boot instructions 208, create a result of the configuration process to an output buffer in host memory, and/or perform any other boot operations that would be apparent to one of skill in the art in possession of the present disclosure. The secondary processing system 210 may continue to execute the initial boot instructions 214 until the secondary processing system 210 is initialized which, in some embodiments, may occur after the primary boot instructions 208 have been validated by the secondary processing system 210 and the boot operation has been handed off to the primary processing system 204.

The method 400 then proceeds to block 408 where a first interrupt event is detected during the execution of the initial boot instructions. In an embodiment of block 408, during the execution of the initial boot instructions 214 by the secondary processing system 210 and prior to handing off the boot operation to the primary processing system 204, the initial boot instructions 214 may reach an interrupt event. For example, the interrupt event may include certain milestones, events, or other occurrences that result from the execution of the initial boot instructions 214 such as, for example, data fabric initialization is completed, data fabric initialization has encountered an error, memory discovery is running, memory discovery is completed, memory discover has encountered errors and/or other milestones apparent to one of skill in the art in possession of the present disclosure. Each milestone may result in the secondary processing system 210 generating a POST code. Similarly, the interrupt event may include an error that occurs when executing the initial boot instructions 214. For example, the secondary processing system 210 may detect a memory error such as, for example, memory not found, memory trained at lower speed than advertised, memory present but cannot be trained. and/or any other error apparent to one of skill in the art in possession of the present disclosure. The error may result in the secondary processing system 210 generating a POST code that may be used as an index. However, in other examples, the secondary processing system 210 may use an index directly or input into another function to generate an index into the interrupt vector table 306, discussed in more detail below.

The method 400 then proceeds to block 410 where, in response to the detection of the interrupt event, the secondary processing system uses the video interpreter binary to update a current graphical user interface displayed on the display screen to provide an updated graphical user interface for display on the display screen. In an embodiment of block 410, the initial boot instructions 214 may cause the secondary processing system 210 to call the video interpreter binary 216 to service the interrupt event. The interrupt event may include an identifier such as, for example, a POST code, an error code, and/or any other identifier that would be apparent to one skill in the art in possession of the present disclosure. The secondary processing system 210 may use that identifier from the interrupt event to locate that identifier in the interrupt vector table 306, and retrieve a corresponding offset for that identifier that points to a location of an associated byte code sequence 308a-308n for that identifier in the video interpreter binary 216. For example, referring to FIG. 3, the interrupt event may include POST code 1. The secondary processing system 210 may locate the offset for POST code 1, and may then locate the byte code sequence 308a for POST code 1. The secondary processing system 210 may then execute the byte code sequence 308a for POST code 1, which may be configured to cause the display controller 226 to update the display screen of the display system 228 from the initial graphical user interface to an updated graphical user interface. The updated graphical user interface may display the POST code that caused the interrupt event in order to notify the user of the milestone and/or error in the initial boot operation defined by the initial boot instructions 214.

Figure 5:
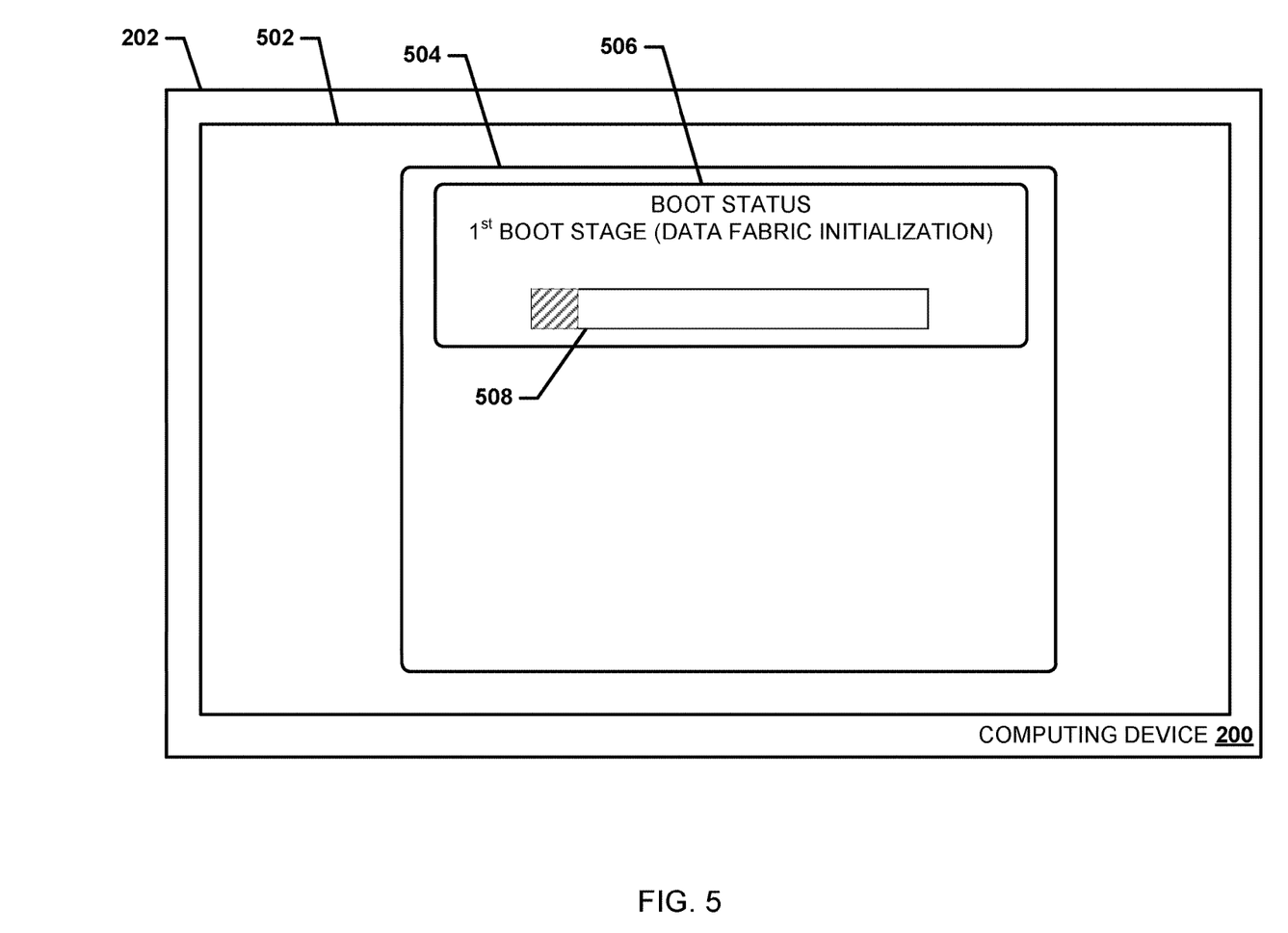
FIG. 5 is a screenshot view illustrating an embodiment of a graphical user interface provided on a display screen by the early boot display system during a boot operation of the computing device of FIG. 2.

For example, referring to FIG. 5, the computing device 200 is illustrated with a display screen 502. The display screen 502 may provide the updated graphical user interface 504 that identifies that the initial boot instructions 214 have completed a first boot stage of the initial boot operation. For example, the secondary processing system 210 may have advanced to data fabric initializing. The updated graphical user interface 504 may include a text box 506 identifying to the user the interrupt event that caused the display of the updated graphical user interface 504, a status bar 508 identifying a status of the initial boot operation, and/or any other information that would be apparent to one of skill in the art in possession of the present disclosure.

The method 400 will then proceed to block 412 where the secondary processing system 210 may determine whether the interrupt event was an error event that warrants the boot operation to halt. For example, memory is not found, memory is present but not trained in certain slots, a memory speed is not supported, memory is trained at lower speed than advertised, and/or other errors may cause the boot operation to halt. If, at block 412, it is determined that an error event occurred that requires the boot operation to halt, the method 400 will proceed to block 414, where the secondary processing system 210 halts and does not return to executing the initial boot instructions 214. If it is determined that the interrupt event is not an error event that warrants the boot operation to halt, the method 400 may proceed to block 416 where it is determined whether the primary processing system 204 has been initialized and has been provided control of the boot operation. If the processing system 204 has not been initialized and provided control of the boot operation, the method 400 proceeds back to 406 where the secondary processing system 210 continues to execute the remaining initial boot instructions 214 and, in some embodiments, subsequent interrupt events cause further updates to the graphical user interface.

Figure 6:
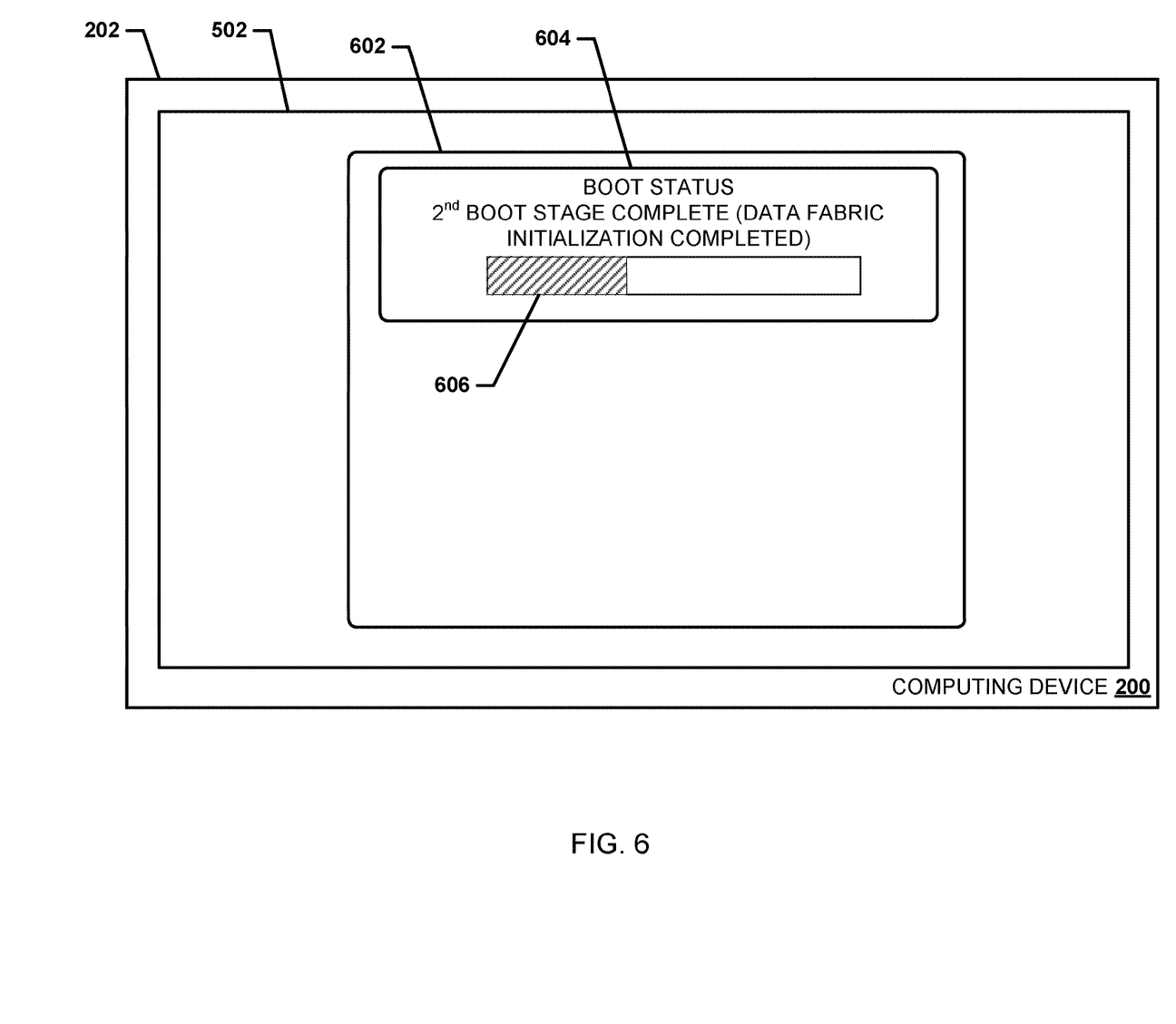
FIG. 6 is a screenshot view illustrating an embodiment of a graphical user interface provided on a display screen by the early boot display system during a boot operation of the computing device of FIG. 2.

As illustrated in FIG. 6, the display screen 502 may provide an updated graphical user interface 602 that identifies that the initial boot instructions 214 have completed a second boot stage of the initial boot operation. For example, the secondary processing system 210 may have advanced to data fabric initialization has completed. The updated graphical user interface 602 may include a text box 604 identifying to the user the interrupt event that caused the display of the graphical user interface 602, a status bar 606 identifying a status of the initial boot operation, and/or any other information that would be apparent to one of skill in the art in possession of the present disclosure.

Figure 7:
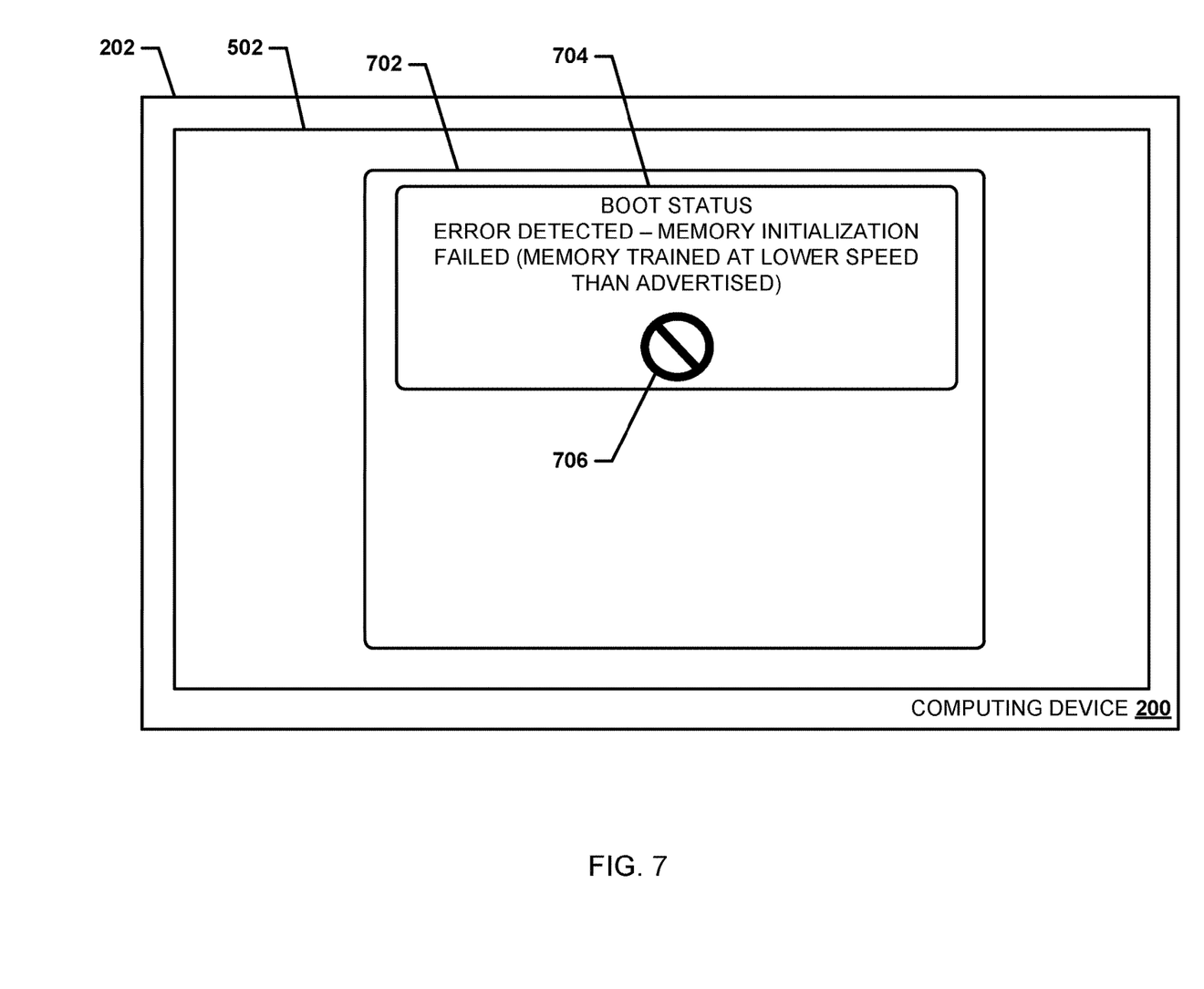
FIG. 7 is a screenshot view illustrating an embodiment of a graphical user interface provided on a display screen by the early boot display system during a boot operation of the computing device of FIG. 2.

Referring now to FIG. 7, the display screen 502 may provide an updated graphical user interface 702 that displays that the execution of the initial boot instruction 214 has resulting in the detection of an error in the initial boot operation. For example, during the initial boot operation, the secondary processing system 210 may detect during memory initialization that memory is trained at lower speed than advertised. The updated graphical user interface 702 may include a text box 704 identifying to the user the interrupt event that caused the display of the graphical user interface 702, a status indicator 706 identifying the status of the initial boot operation, and/or any other information that would be apparent to one of skill in the art in possession of the present disclosure.

If at block 414 it is determined the primary processing system 204 has been initialized and has been provided control of the boot operation, the method 400 may end as the primary processing system 204, which executes the primary boot instructions 208 to perform the BIOS processes that result in the loading of the OS 222, may provide its own graphical user interfaces to the display controller 226 for display on a display screen of the display system 228.

Thus, systems and methods have been described that provide for early boot video display in a computing device. The early boot video display may provide updates on a display screen during an initial boot operation of the computing device that may occur while a secondary processing system is validating primary boot instructions for execution by a primary processing system to ultimately result in the loading of the operating system for the computing device. Conventional systems either do not provide video to a display device during this initial boot operation, or provide a static image that simply indicates that the computing system has been powered on. However, during this initial boot operation, hardware components are being initialized, firmware images are being validated to ensure the computing system is secure, and other initial boot operations are executed. Furthermore, some of these initial boot operations such as, for example, training memory (e.g., training a non-volatile dual inline memory module (NV-DIMM)), may require a relatively long period of time to complete and/or result in errors, and the static image display in conventional systems provide the user with little to no information as to the status of initial boot operations and/or what caused the error. The systems and methods of the present disclosure solve such issues by providing status reports and errors to the user via a display system as video before the primary boot instructions are executed by the primary processing system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computing system, comprising:
    a display system that includes a display controller and a display screen;
    a first memory system that includes initial boot instructions and a video interpreter binary;
    a primary processing system; and
    a secondary processing system that is coupled to the primary processing system and the display system, wherein the secondary processing system is configured to access the first memory system to:
        load the initial boot instructions and the video interpreter binary during a boot operation;
        initialize the display controller included in the display system to provide a first graphical user interface for display on the display screen using the video interpreter binary;
        execute the initial boot instructions; and
        detect a first interrupt event during the execution of the initial boot instructions and, in response, trigger the video interpreter binary to update the first graphical user interface displayed on the display screen to provide a second graphical user interface for display on the display screen.

2. The system of claim 1, wherein the secondary processing system is further configured to:
    pass control of the boot operation to the primary processing system to provide for execution of primary boot instructions upon completion of the execution of the initial boot instructions.

3. The system of claim 2, further comprising:
    a second memory system that is coupled to the primary processing system, wherein the second memory system includes the primary boot instructions.

4. The system of claim 2, wherein the secondary processing system is further configured to:
    verify, in response to execution of the initial boot instructions, an integrity of the primary boot instructions.

5. The system of claim 1, wherein the triggering of the video interpreter binary to update the first graphical user interface displayed on the display screen to provide the second graphical user interface for display on the display screen includes:
    determine, based on a first offset that is stored in an interrupt vector table included in the video interpreter binary and that is identified by the first interrupt event, a first code entry in the interrupt vector table; and
    execute the first code entry to update the first graphical user interface displayed on the display screen to provide the second graphical user interface for display on the display screen.

6. The system of claim 5, wherein a first Power On Self Test (POST) code triggers the first interrupt event, and wherein the first interrupt event identifies the first POST code from which the first offset may be determined.

7. The system of claim 1, wherein the secondary processing system is further configured to:
    detect a second interrupt event during the execution of the initial boot instructions and, in response, trigger the video interpreter binary to update the second graphical user interface displayed on the display screen to provide a third graphical user interface for display on the display screen.

8. An information handling system (IHS), comprising:
    a display system that includes a display controller and a display screen;
    a first memory system that includes initial boot instructions and a video interpreter binary;
    a primary processing system; and
    a secondary processing system that is coupled to the primary processing system and the display system, wherein the secondary processing system is configured to access the first memory system to:
        load the initial boot instructions and the video interpreter binary during a boot operation;
        initialize the display controller included in the display system to provide a first graphical user interface for display on the display screen using the video interpreter binary;
        execute the initial boot instructions; and
        detect a first interrupt event during the execution of the initial boot instructions and, in response, trigger the video interpreter binary to update the first graphical user interface displayed on the display screen to provide a second graphical user interface for display on the display screen.

9. The IHS of claim 8, wherein the secondary processing system is further configured to:
    pass control of the boot operation to the primary processing system to provide for execution of primary boot instructions upon completion of the execution of the initial boot instructions.

10. The IHS of claim 9, further comprising:
    a second memory system that is coupled to the primary processing system, wherein the second memory system includes the primary boot instructions.

11. The IHS of claim 9, wherein the secondary processing system is further configured to:
    verify, in response to execution of the initial boot instructions, an integrity of the primary boot instructions.

12. The IHS of claim 8, wherein the triggering of the video interpreter binary to update the first graphical user interface displayed on the display screen to provide the second graphical user interface for display on the display screen includes:
    determine, based on a first offset that is stored in an interrupt vector table included in the video interpreter binary and that is identified by the first interrupt event, a first code entry in the interrupt vector table; and
    execute the first code entry to update the first graphical user interface displayed on the display screen to provide the second graphical user interface for display on the display screen.

13. The IHS of claim 12, wherein a first Power On Self Test (POST) code triggers the first interrupt event, and wherein the first interrupt event identifies the first POST code from which the first offset may be determined.

14. The IHS of claim 8, wherein the secondary processing system is further configured to:
   detect a second interrupt event during the execution of the initial boot instructions and, in response, trigger the video interpreter binary to update the second graphical user interface displayed on the display screen to provide a third graphical user interface for display on the display screen.

15. A method for providing early boot video, comprising:
   loading, by a secondary processing system from a first memory system, initial boot instructions and a video interpreter binary during a boot operation;
   initializing, by the secondary processing system a display controller included in a display system to provide a first graphical user interface for display on a display screen included on the display system using the video interpreter binary;
   executing, by the secondary processing system, the initial boot instructions; and
   detecting, by the secondary processing system, a first interrupt event during the execution of the initial boot instructions and, in response, triggering the video interpreter binary to update the first graphical user interface displayed on the display screen to provide a second graphical user interface for display on the display screen.

16. The method of claim 15, further comprising:
   passing, by the secondary processing system, control of the boot operation to a primary processing system to provide for execution of primary boot instructions upon completion of the execution of the initial boot instructions.

17. The method of claim 16, wherein the primary boot instructions are stored on a second memory system that is coupled to the primary processing system.

18. The method of claim 16, further comprising:
   verifying, by the secondary processing system and in response to execution of the initial boot instructions, an integrity of the primary boot instructions.

19. The method of claim 15, wherein the triggering of the video interpreter binary to update the first graphical user interface displayed on the display screen to provide the second graphical user interface for display on the display screen includes:
   determining, by the secondary processing system and based on a first offset that is stored in an interrupt vector table included in the video interpreter binary and that is identified by the first interrupt event, a first code entry in the interrupt vector table; and
   executing, by the secondary processing system, the first code entry to update the first graphical user interface displayed on the display screen to provide the second graphical user interface for display on the display screen.

20. The method of claim 15, further comprising:
   detecting, by the secondary processing system, a second interrupt event during the execution of the initial boot instructions and, in response, trigger the video interpreter binary to update the second graphical user interface displayed on the display screen to provide a third graphical user interface for display on the display screen.

* * * * *